United States Patent [19]

Farkas

[11] 4,242,925
[45] Jan. 6, 1981

[54] REVERSING APPARATUS

[75] Inventor: Alexander Farkas, Sunnyvale, Calif.

[73] Assignee: Westinghouse Electric Corp., Pittsburgh, Pa.

[21] Appl. No.: 925,086

[22] Filed: Jul. 17, 1978

[51] Int. Cl.³ .............................................. F16H 3/44
[52] U.S. Cl. ........................................ 74/792; 74/674
[58] Field of Search ......................... 74/792, 674, 789

[56] References Cited

U.S. PATENT DOCUMENTS

| 2,690,086 | 9/1954 | Cook et al. | 74/792 |
| 2,959,987 | 11/1960 | Miller | 74/792 |
| 3,008,341 | 11/1961 | Cobb | 74/792 |
| 3,563,114 | 2/1971 | Casale | 74/792 |

Primary Examiner—Kenneth Downey
Attorney, Agent, or Firm—F. J. Baehr, Jr.

[57] ABSTRACT

Planetary gears are cooperatively associated with a clutch and brake to provide reversing of a propeller driven by a unidirectional prime mover.

10 Claims, 2 Drawing Figures

REVERSING APPARATUS

BACKGROUND OF THE INVENTION

This invention relates to reversing gears and more particularly to the use of planetary gears for reversing the direction of rotation of fixed pitched propellers of a ship.

Ship propulsion systems require some method of reversing the thrust produced by the propellers in order to slow down, stop, and reverse the movement of the ship. Steam turbines utilized as drives for ships often incorporate special blading which can be utilized to reverse the direction of rotation of the turbine. However, most diesel engines, gas turbines, as well as many steam turbines are unidirectional, that is, their direction of rotation is fixed so they can only rotate in one direction. Thus, in order to slow down, stop and reverse the movement of a ship, reversing gears, variable pitch propellers, or separate drives are utilized. Ship propulsion systems are very large, thousands of horsepower, thus the reversing apparatus must be able to transmit large quantities of energy efficiently, reliably, and must be easy to maintain.

SUMMARY OF THE INVENTION

In general, reversing apparatus for reversing a propeller of a ship driven by a unidirectional drive, when made in accordance with this invention, comprises a first shaft connected to the unidirectional drive, a second shaft connected to the propeller, a sun gear affixed to the first shaft, a plurality of planet gears meshing with the sun gear, and a ring gear meshing with the planet gears. The planet gears are rotatably disposed on a planet carrier and a brake is connected to the planet carrier to stop its rotation when energized and reverse the direction of rotation of the second shaft and the propeller and to dissipate energy in the engaging process.

BRIEF DESCRIPTION OF THE DRAWINGS

The objects and advantages of this invention will become more apparent from reading the following detailed description in connection with the accompanying drawings, in which.

DESCRIPTION OF THE PREFERRED EMBODIMENTS

Figure 1:
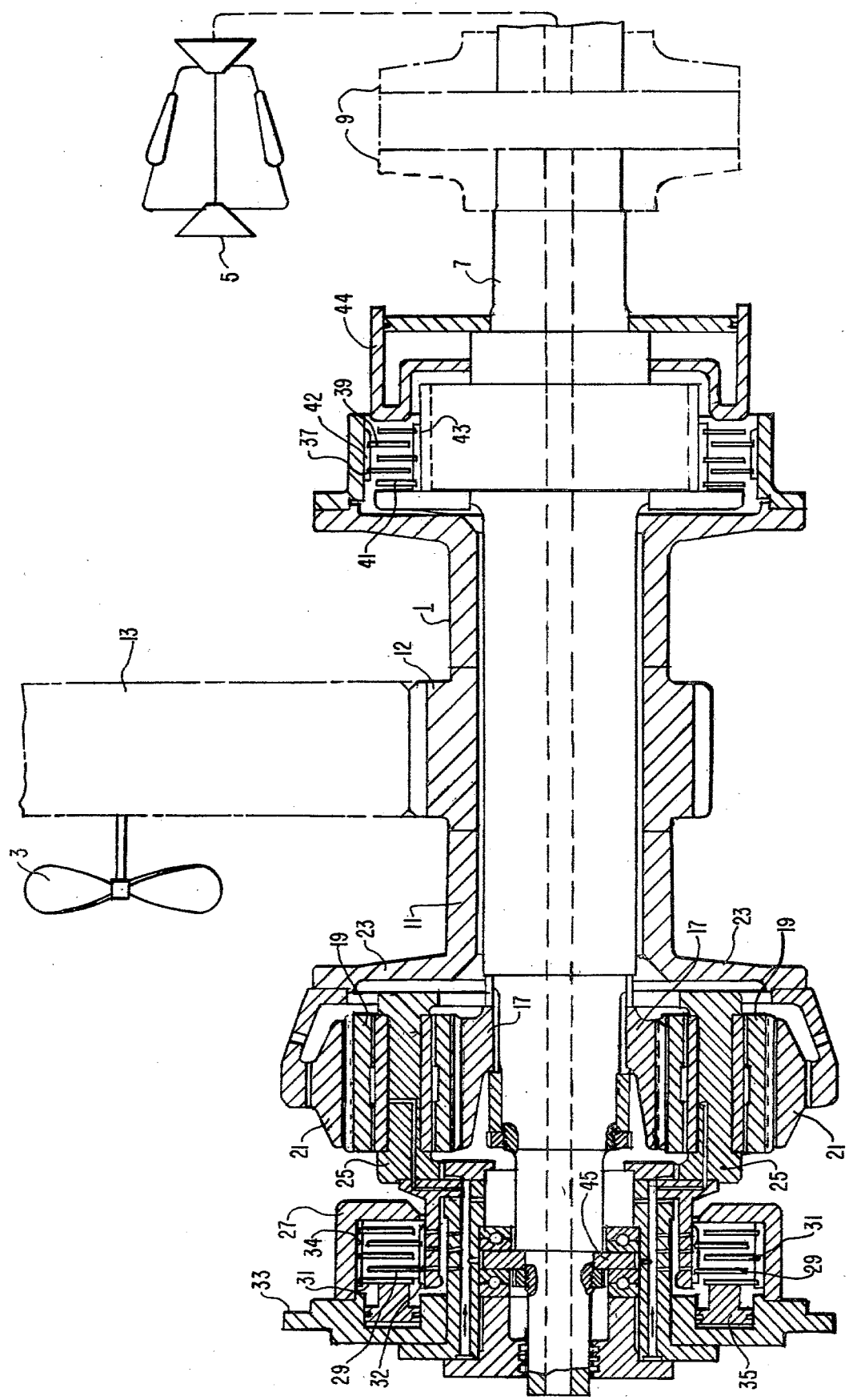
FIG. 1 is a partial sectional view of reversing apparatus made in accordance with this invention.

Referring now to the drawings in detail, and in particular to FIG. 1 there is shown reversing apparatus 1 for reversing the direction of rotation of a ship's propeller 3 driven by a unidirectional prime mover 5 such as a gas turbine.

The reversing apparatus 1 comprises a first shaft 7 connected or coupled to the prime mover 5 by a coupling 9 and a second shaft 11 concentrically disposed to encircle the first shaft 7. The second shaft 11 has a pinion gear 12 disposed thereon. The pinion gear 12 is a part of a double-reduction gear train 13, which is coupled to the propeller 3. The double-reduction gear train is preferably made up of double helical, herringbone or similiar gears, which do not require thrust balancing.

A sun gear 17 is disposed on the first shaft 7 and a plurality of planet gears 19 engage the sun gear 17. A ring, internal or annular gear 21 encircles and engages the planet gears 19. The ring gear 21 is connected to the second shaft 11 by a flange 23.

The planet gears 19 are rotatably disposed in a planet carrier 25. A brake 27 is cooperatively associated with the planet carrier 25. The brake 27 comprises a plurality of interdigitated discs 29 and 31 generally half of which are connected to the planetary 25 of a spline 32 or other means. The other half are connected to a fixed housing 33 by a spline 34 or other means. A hydraulic piston or other biasing means 35 brings the discs 29 and 31 into engagement stopping the rotation of the planet carrier 25 and dissipating energy.

A clutch 37 is disposed between the first and second shaft 7 and 11, respectively. The clutch 37 has a plurality of interdigitated discs 39 and 41 generally half of which are connected to each shaft by splines 42 and 43 or other means. A hydraulic piston or other bias means 44 forces the discs 39 and 41 into engagement to transmit rotation from the first to the second shaft 7 and 11, respectively.

A two directional thrust bearing 45 is disposed on the first shaft in order to rotatably support thrust in either direction.

The operation of the apparatus 1 for reversing the direction of rotation of the propellers 3 of a ship as shown in FIG. 1 is as follows:

When both the brake 27 and clutch 37 are disengaged the first shaft 7 rotates rotating the sun gear 17 which rotates the planet gears 19. The planet carrier 25 is free to rotate so that no torque is transmitted through ring gear 21 to the second shaft 11 which is connected to the propeller 3.

Engaging the clutch 37 transmits the torque from the first shaft 7 directly to the second shaft 11, both shafts turn in the same direction and cause the propeller 3 to rotate in the ahead direction.

When the clutch 37 is disengaged no torque is transmitted, however, the propeller 3 and gear train continue to rotate in the ahead direction do to the inertia of the apparatus and the forward movement of the ship. As the brake 27 is applied it slows down the planet carrier 25 absorbing energy from the second shaft 11 which is being driven by the propeller 3. When the planet carrier 25 is stopped by the brake 27 torque is being transmitted from the prime mover 5 to the propeller 3 which begins to turn in the astern direction as the sun gear 17 rotates the planetary gears 19 and since the planet carrier 25 is fixed, the ring gear 21 is rotated. The ring gear inturn rotates the second shaft 11 and the pinion gear 12, which operates through the double-reduction gear train 13 to drive the propeller 3 in the astern direction.

Figure 2:
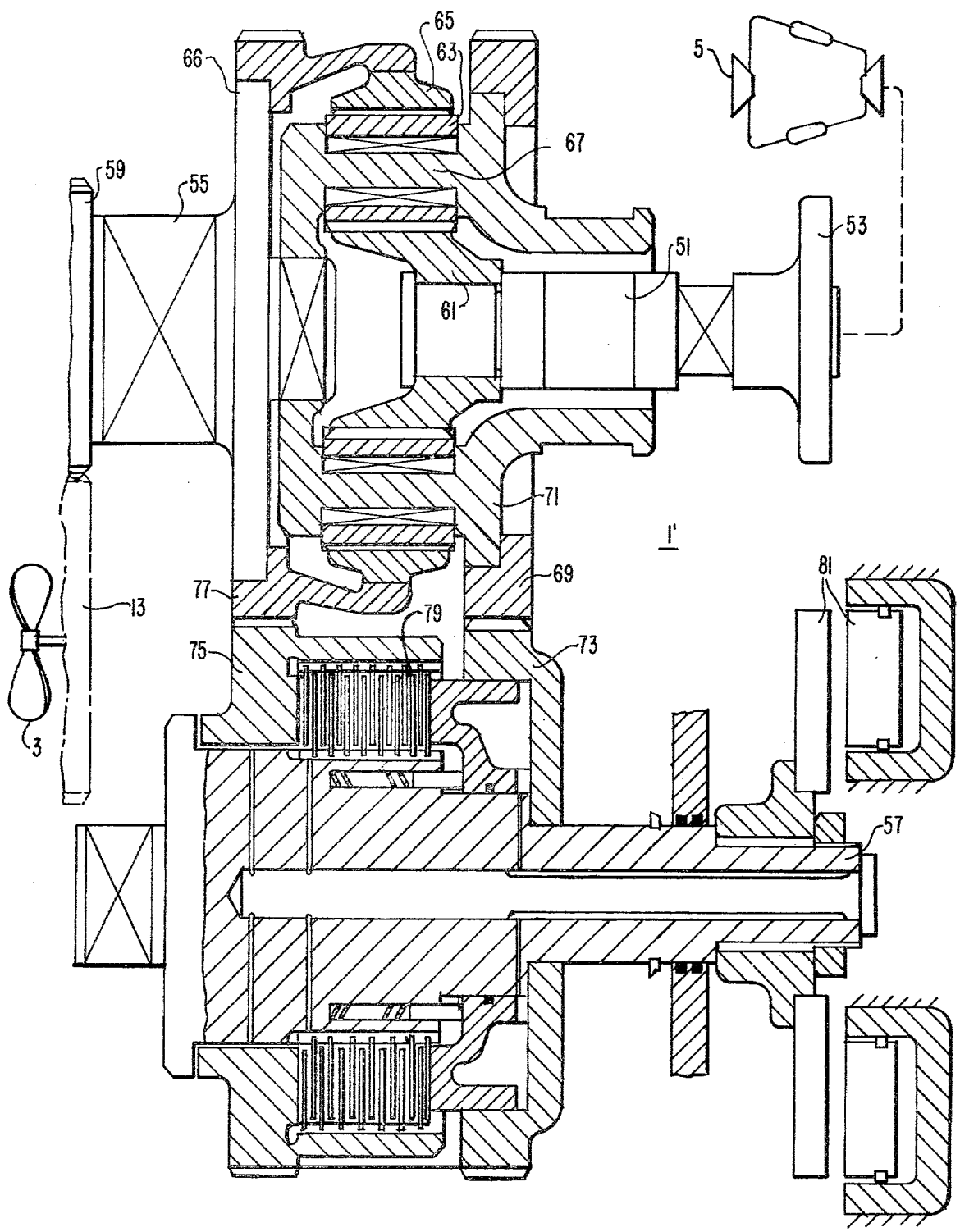
FIG. 2 is a partial sectional view of alternate reversing apparatus.

Referring now to FIG. 2 there is shown another embodiment of the reversing apparatus 1' which comprises a first shaft 51 coupled or connected to the prime mover 5 by a coupling 53, a second shaft 55 axially aligned with the first shaft 51 and a third shaft 57 disposed generally parallel to the first and second shaft 51 and 55, respectively. A pinion gear 59 is disposed on the second shaft 55 and is a portion of a double-reduction gear train 13 which is coupled to the propeller 3.

A sun gear 61 is disposed on the end of the first shaft 51 adjacent the second shaft 55. A plurality of planet gears 63 are disposed in engagement with the sun gear 61. A ring gear 65 encircles and engages the planetary gears 63. The ring gear 65 is connected to the second shaft 55 by a flange 66.

A planet carrier 67 is rotatably disposed on one end of the second shaft 55 and has a spur gear 69 disposed on an outer flange 71 forming a portion of the planet carrier 67. A mating spur gear 73 is connected to the third shaft 57.

A spur gear 75 is rotatably disposed on the shaft 57 and engages a spur gear 77 connected to the ring gear 65 and the second shaft 55. Spur gears as utilized in this specification are utilized as a generic term and comprise helical, double helical, herringbone, and other gears having parallel axis. The spur gears 69 and 77 have the same pitch diameter and number of teeth and the spur gears 73 and 75 each have the same pitch diameter and number of teeth.

A clutch 79 is interposed between the spur gears 73 and 75. The clutch 79 is being so disposed between the gears 73 and 75 that when engaged the clutch 76 causes the gears 73 and 75 to generally rotate in unison.

A brake 81 is cooperatively associated with the third shaft 57 to slow it down and stop it from rotating when the brake 81 is engaged. Since the second shaft 55 is connected to the third shaft 57 through the spur gears 69 and 73 the brake 81 also slows down and stops the third shaft which is connected to the propeller 3.

The operation of the apparatus 1' for reversing the direction of rotation of the propellers 3 as shown in FIG. 2 is as follows:

When both the clutch 79 and brake 81 are disengaged the first shaft 51 rotates the sun gear 61, which rotates the planet gears 63. The planet carrier 67 is free to rotate so that no torque is transmitted through the ring gear 65 to the second shaft 55. The third shaft 57 rotates freely being driven by the spur gears 69 and 73.

Engaging the clutch 79 causes torque to be transmitted through the spur gear 75 and 77 to the second shaft 55. The planet carrier 67 and second shaft 55 tend to rotate in unison, torque being transmitted through the spur gears 69 and 73, and 75 and 77. The first and second shafts 51 and 55, respectively, tend to rotate in the same direction driving the propeller 3 in the ahead direction. The second and third shafts 55 and 57, respectively, tend to rotate at the same speed.

When the clutch 79 is disengaged and the brake 81 is applied the brake 81 absorbs energy from the planet carrier 67 slowing it down and eventually stopping it. Once the planet carrier 67 is stopped the sun gear 61 engages and rotates the planetary gears 63, which inturn cause the ring gear 65 to be rotated. The ring gear 65 is connected to the second shaft 55 rotating it in the opposite direction with respect to the first shaft 51, reversing the direction of propellers 3 to the stern direction in order to slow down, stop and reverse the ship's movement from its ahead to its astern direction.

The apparatus hereinbefore described meets reversing requirements of a ship's propulsion system having a unidirectional-rotating-prime mover, reduction gear and fix pitched propeller. The brake and clutches can absorb the energy envolved for normal maneuvering of the ship and the apparatus provides a one-to-one ratio between the drive and driven shafts during normal ahead operation.

What is claimed is:

1. Reversing apparatus for reversing a propeller of a ship driven by a unidirectional drive, said apparatus comprising
   a first shaft directly connected to the unidirectional drive;
   a second shaft connected to the propeller;
   a sun gear affixed to said first shaft;
   a plurality of planet gears meshing with said sun gear;
   a ring gear directly connected to the second shaft and meshing with said planet gears;
   said planet gears being rotatably disposed in a planet carrier;
   braking means connected to said planet carrier to stop rotation of said planet carrier when engaged and reversing the direction of rotation of said second shaft and the propeller; and
   clutching means disposed between said first and second shaft whereby engagement of said clutch and disengagement of the brake will cause the first and second shafts to rotate in the same direction and the propeller to rotate in the ahead direction.

2. Apparatus as set forth in claim 1 and further comprising a third shaft generally parallel to the first and second shaft.

3. Apparatus as set forth in claim 2, wherein third shaft has the brake and clutch disposed thereon.

4. Apparatus as set forth in claim 2 are further comprising a spur gear disposed on the second shaft and a spur gear disposed on the planet carrier and wherein the third shaft has two spur gears disposed thereon one of which is disposed to engage the spur gear disposed on the second shaft and the other is disposed to engage the spur gear disposed on the planet carrier.

5. Apparatus as set forth in claim 3, wherein the third shaft has two spur gears disposed thereon one of which is disposed to engage a spur gear disposed on the second shaft and the other is disposed to engage a spur gear disposed on the planet carrier.

6. Apparatus as set forth in claim 3, wherein the first and second shafts are in axial alignment.

7. Apparatus as set forth in claim 1, wherein the first and second shafts are in axial alignment.

8. Apparatus as set forth in claim 1 wherein the first and second shafts are concentric.

9. Apparatus as set forth in claim 8, wherein the second shaft has a pinion gear disposed thereon.

10. Apparatus as set forth in claim 1, wherein the second shaft has a pinion gear disposed thereon.

* * * * *